(12) United States Patent
Kelly et al.

(10) Patent No.: US 6,526,150 B2
(45) Date of Patent: Feb. 25, 2003

(54) TELEPHONE LOUDSPEAKER ENCLOSURE

(75) Inventors: Daniel B. Kelly, Round Rock, TX (US); Jason B. Kihneman, Austin, TX (US); Wayne E. McKinnon, Georgetown, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/113,538

(22) Filed: Jul. 10, 1998

(65) Prior Publication Data

US 2002/0057816 A1 May 16, 2002

(51) Int. Cl.[7] ............................................. A04R 25/00
(52) U.S. Cl. .................. 381/353; 455/568; 455/569; 379/430; 379/433; 381/392; 381/345; 381/386; 381/354
(58) Field of Search ................................ 381/344, 386, 381/392, 345, 71.7; 455/568, 569; 379/430, 433

(56) References Cited

U.S. PATENT DOCUMENTS

| | | | |
|---|---|---|---|
| 3,257,516 A | * | 6/1966 | Knowles |
| 4,453,045 A | * | 6/1984 | Bruna |
| 4,550,429 A | * | 10/1985 | Burbank ....................... 381/90 |
| 4,845,760 A | * | 7/1989 | Awakowicz |
| 5,883,966 A | * | 3/1999 | Kubo |
| 6,002,949 A | * | 12/1999 | Hawker |
| 6,018,584 A | * | 1/2000 | Paulick ......................... 381/122 |
| 6,021,195 A | * | 2/2000 | Brawne |
| 6,026,283 A | * | 2/2000 | Stephenson ................... 455/90 |
| 6,038,327 A | * | 3/2000 | Bleim .......................... 381/344 |
| 6,038,328 A | * | 3/2000 | Hsu ............................. 381/361 |
| 6,058,315 A | * | 5/2000 | Clark ............................ 455/550 |

* cited by examiner

Primary Examiner—Curtis Kuntz
Assistant Examiner—Dionne N. Harvey

(57) ABSTRACT

An apparatus for a microphone and speaker is provided which provides a sealed chamber behind the speaker to prevent sound waves behind the speaker from cancelling sound waves in front of the speaker. In addition, the apparatus is configured to mechanically isolate the speaker from the apparatus housing in order to improve performance of the system. A pliant material such as a damping material with a relatively linear compression characteristic, such as a thermal plastic elastomer, may be used to isolate the speaker from the apparatus housing as well as providing a relatively air tight chamber behind the speaker.

17 Claims, 6 Drawing Sheets

TELEPHONE LOUDSPEAKER ENCLOSURE

TECHNICAL FIELD OF THE INVENTION

The present invention relates to an apparatus which includes a speaker and a microphone, such as a telephone, intercom, two-way radio and the like, and more particularly, to an apparatus which includes a speaker and a microphone which provides acoustical and mechanical isolation between the speaker and a microphone to provide improved audio performance as well as allow for streamlined manufacturing of the apparatus and thus reduced costs.

DESCRIPTION OF THE RELATED ART

Various apparatus are known which include speakers and microphones, carried by a common housing. Speaker phones, intercoms, two-way radios and the like are examples of such apparatus. There are several known disadvantages of such apparatus. First, such apparatus are known to have undesirable audio performance resulting from non-linear mechanical coupling between the speaker and the microphone. More particularly, in many known apparatus, the speaker energy is known to cause non-linear vibration of the microphone support structure which carries the microphone which, in turn, is coupled to the microphone. Second, the loudspeaker energy is known to cause vibration of various parts within the apparatus, which can produce non-linear vibrational noise, known to be acoustically coupled to the microphone. Third, the second waves from behind the speaker are known to cancel sound waves in front of the speaker, thus degrading audio performance.

Another known problem with such existing apparatus is the complexity of assembly. In particular, known apparatus for housing speakers and microphones are known to include a relatively large number of parts and require a relatively large number of steps for assembly. As such, such known apparatus are relatively expensive to manufacture. Thus, there is a need to provide an apparatus which causes a microphone and speaker which provides increased audio performance as well as facilitates manufacturing thus reducing the cost of the apparatus.

SUMMARY OF THE INVENTION

In accordance with the present invention, an apparatus is formed with a sealed chamber behind the speaker which provides improved isolation between the speaker and microphone to prevent sound waves behind the speaker from cancelling sound waves in front of the speaker. In addition, the speaker is mechanically isolated from the apparatus housing in order to improve performance of the system. A pliant material, such as a damping material with a relatively linear compression characteristic, such as a thermal plastic elastomer, may be used to isolate the speaker from the apparatus housings as well as providing a relatively air tight chamber behind the speaker.

BRIEF DESCRIPTION OF THE DRAWINGS

Other features, objects and advantages of the present invention will be come readily apparent and understood upon consideration of the following detailed description and attached drawings, wherein.

DETAILED DESCRIPTION OF THE INVENTION

The present invention relates to an apparatus which houses a speaker and a microphone. As described and illustrated herein, the apparatus is described in terms of a telephone and in particular a speaker phone. However, the principals of the present invention are readily applicable to other types of apparatus which include a speaker and a microphone carried by a common housing, such as an intercom, two-way radio and the like.

Figure 1:
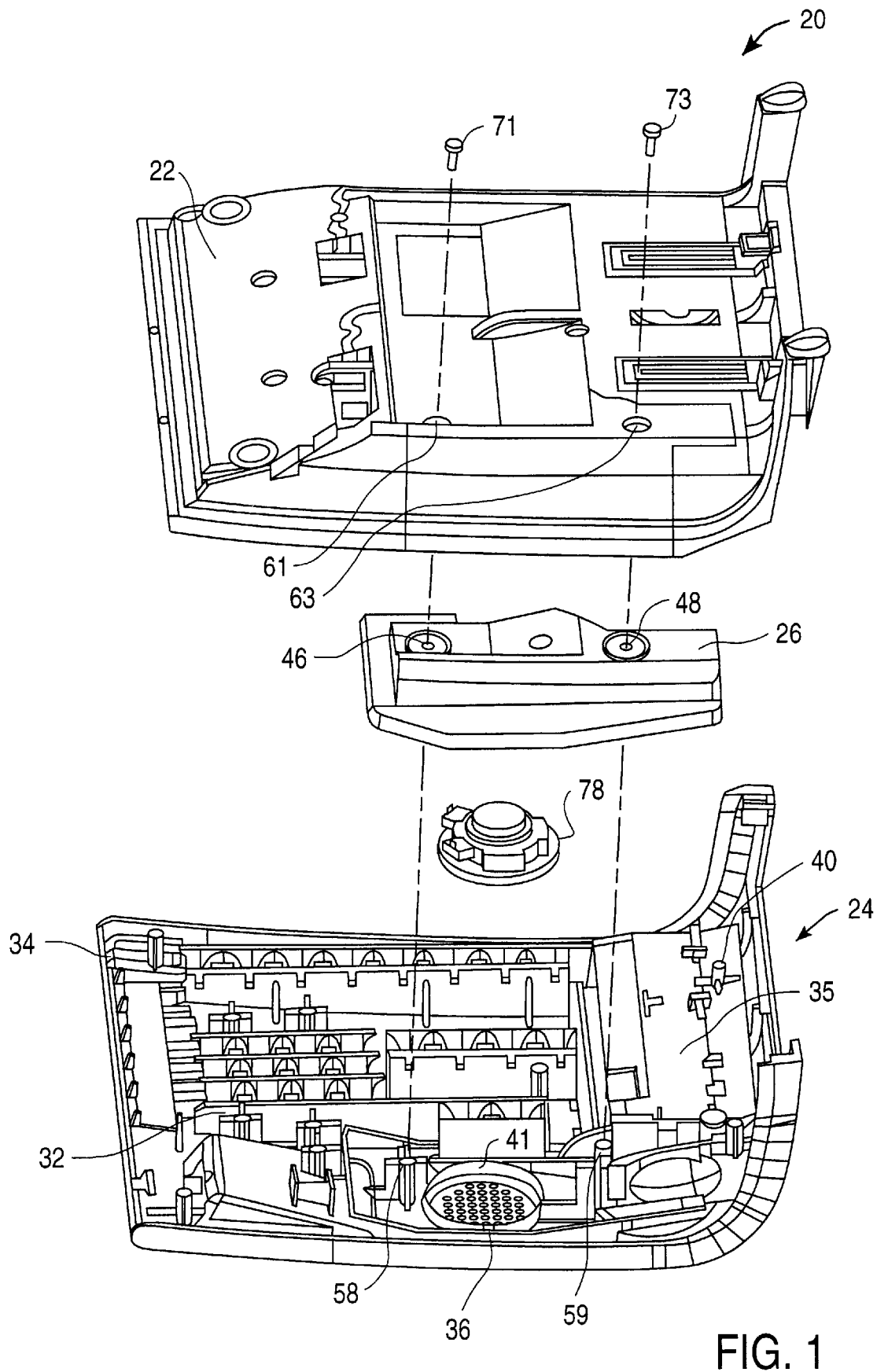
FIG. 1 is an exploded perspective view of a telephone in accordance with the present invention illustrating the structure and alignment of the speaker enclosure in accordance with the present invention, shown with the printed circuit cards and the microphone removed for clarity.

Turning to FIG. 1, a telephone in accordance with the present invention is illustrated and generally identified with the reference numeral 20. The telephone 20 is shown disassembled and upside down for purposes of clarity. The telephone includes a first housing member or base unit 22, a second housing member or a top cover 24, a speaker enclosure 26 and a speaker 28. Other components of the telephone, such as printed circuit cards, a microphone are removed for clarity.

In accordance with an important aspect of the invention, the configuration of the telephone 20 provides several distinct advantages over known telephone speaker phones. First, the configuration provides mechanical and acoustical isolation between the speaker 28 and a microphone (not shown), in order to improve the overall audio performance of the system. Secondly, the configuration of the telephone 20 allows for greatly reduced assembly time as well as a reduction of the number of parts which makes it suitable for top down manufacturing, thus reducing the overall cost of the telephone 20.

Figure 2:
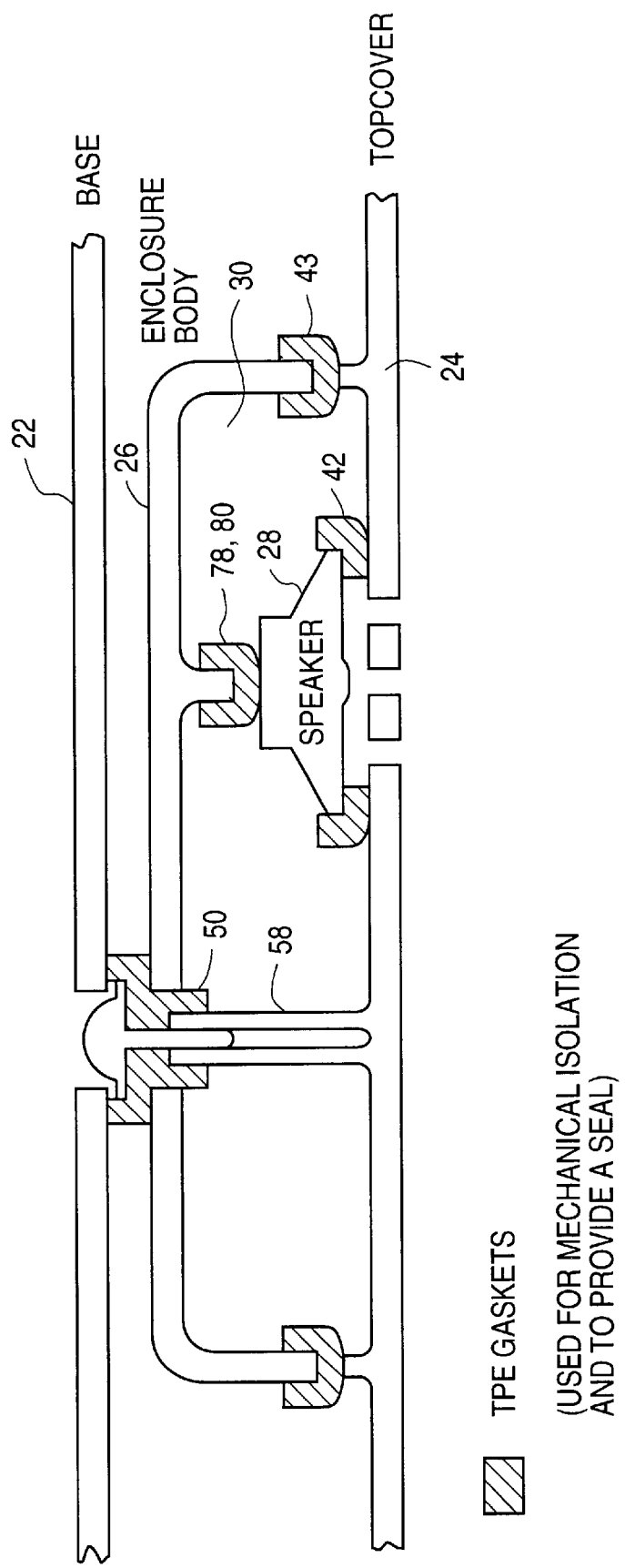
FIG. 2 is a simplified elevational view of the telephone illustrated in FIG. 1, shown assembled, illustrating the contact points between the speaker enclosure and the base and top cover.

One important aspect of the invention, as best illustrated in FIG. 2, is a sealed chamber 30 formed behind the speaker 28. The sealed chamber 30, as discussed in more detail below, improves the audio performance of the telephone 20. The sealed chamber 30 is formed when the top cover 24, speaker enclosure 26 and base 22 are assembled together. As will be discussed in more detail below, the configuration illustrated in FIG. 2 not only provides an airtight chamber 30 behind the speaker 28 but also mechanically isolates the speaker 28 from the speaker enclosure 26 as well as the base 22.

The sealed chamber 30 behind the speaker 28 performs two functions. First, it improves the low frequency response of the speaker 28 be prevented sound waves behind the speaker 28 from cancelling those in front of the speaker 28, which improves the natural sounding voice quality. Secondly, the sealed chamber 30 minimizes sound pressure inside the telephone 20, which provides improved isolation between the speaker 28 and the microphone. In particular, the sealed chamber 30 reduces the vibration of a microphone support structure 34 (FIG. 1), formed in the top cover 24 for carrying the microphone. A reduction of the vibration of the microphone support structure 34 reduces non-linear mechanical coupling of the speaker 28 energy into the microphone. In addition, the sealed chamber 30 reduces vibration of the keypad (not shown) as well as other parts of the telephone 20, known to produce undesired non-linear vibration noise, known to be acoustically coupled to the microphone. The configuration in accordance with the present invention provides acoustical and mechanical isolation of the microphone from the speaker 38 which improves the operational stability of the apparatus and provides improved response of the system by minimizing non-linear mechanical coupling and vibrational noise which cannot be canceled by an echo canceler.

Referring to FIG. 1, the top cover 24 may be an injection molded piece as shown, formed with a plurality of ribs 32 for rigidity. The top cover 22 may be formed with the microphone support structure 34 as well as a speaker support structure 36 for the speaker 28. Alternatively, the support structures 34 and 38 can be formed on different housing members, or both formed in the base. As shown, the microphone support structure 34 and the speaker support structure 36 are spaced apart to minimize acoustical coupling. A support structure 38 is formed in the top cover 24 for carrying a printed circuit board (not shown). The printed circuit board has been removed for clarity. The printed circuit board is adapted to be secured to a threaded post 40. The base 22 may also be formed from plastic and be injection molded. The top cover 24 is configured to seat against the base 22. However, as will be discussed in more detailed below, all of the contact points between the base 22, top cover 24, the speaker enclosure 26 and speaker 28 are by way of a pliant material, such as a damping material having a linear compression characteristic. As such, the speaker 28 as well as the speaker enclosure 26 is mechanically isolated from the base 22 and the top cover 24.

In accordance with another important aspect of the invention, the telephone 20 is formed with a reduced number of parts and configured to facilitate alignment of the parts, which reduces the assembly time of telephone 20 therefore reducing the cost. In particular, as discussed above, the top cover 24 may be formed with a speaker support structure 36. As shown best in FIG. 1, the speaker support structure 36 is formed with an annular wall 36 to facilitate alignment of the speaker 28 relative to the top cover 24. In order to mechanically isolate the speaker 28 from the top cover 24, the speaker 28 is not placed in direct contact with the speaker mounting structure 36. Rather a gasket 42 or other damping material is placed between the top cover 24 and the speaker 28. The gasket 42 not only mechanically isolates the speaker 28 from the top cover 24, but also forms a part of the seal to form the air tight chamber 30 behind the speaker 28, as shown best in FIG. 2.

Figure 4:
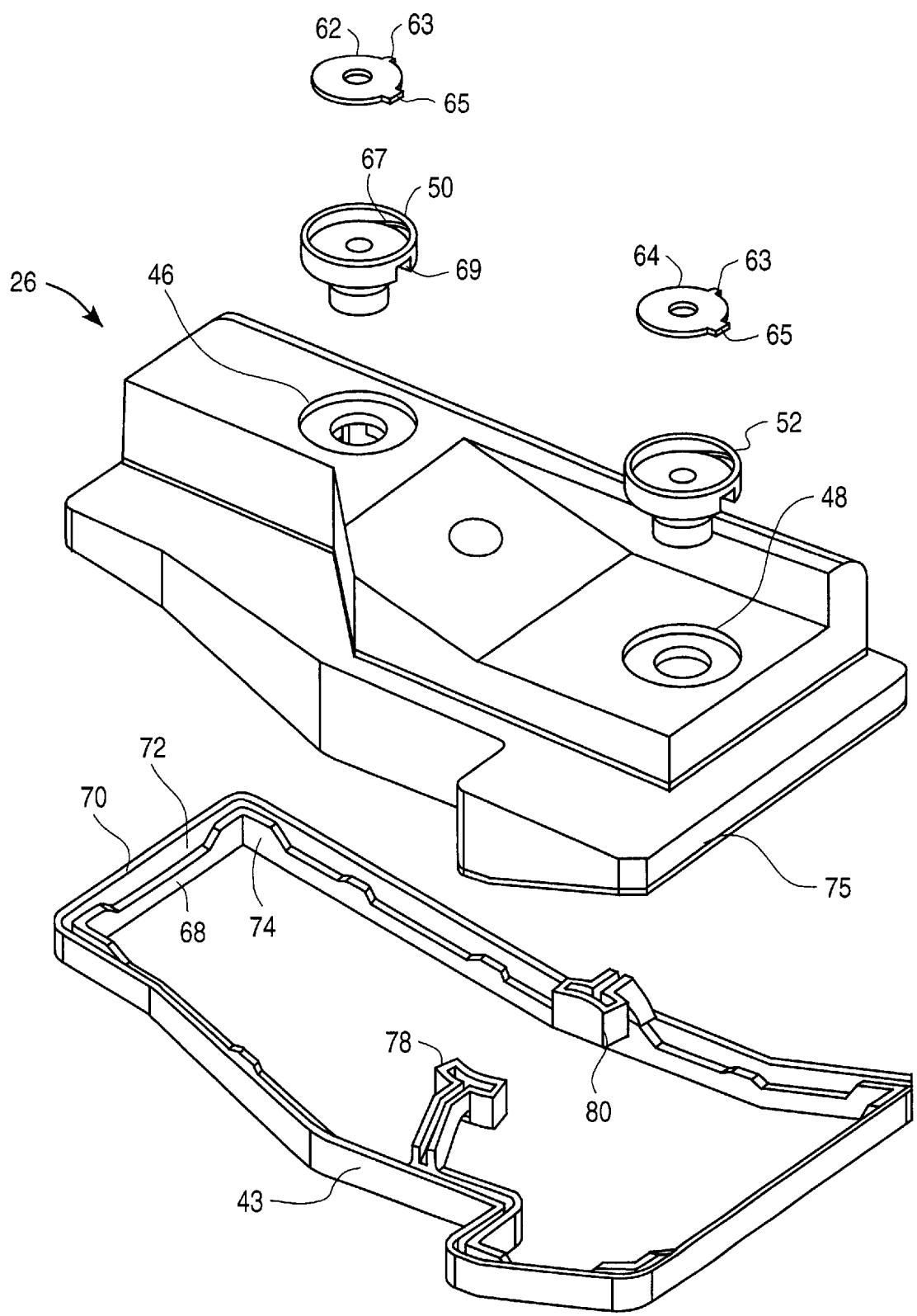
FIG. 4 is a top plan view of the speaker enclosure in accordance with the present invention shown with a main gasket and a pair of shoulder gaskets and retaining washers removed.
Figure 5:
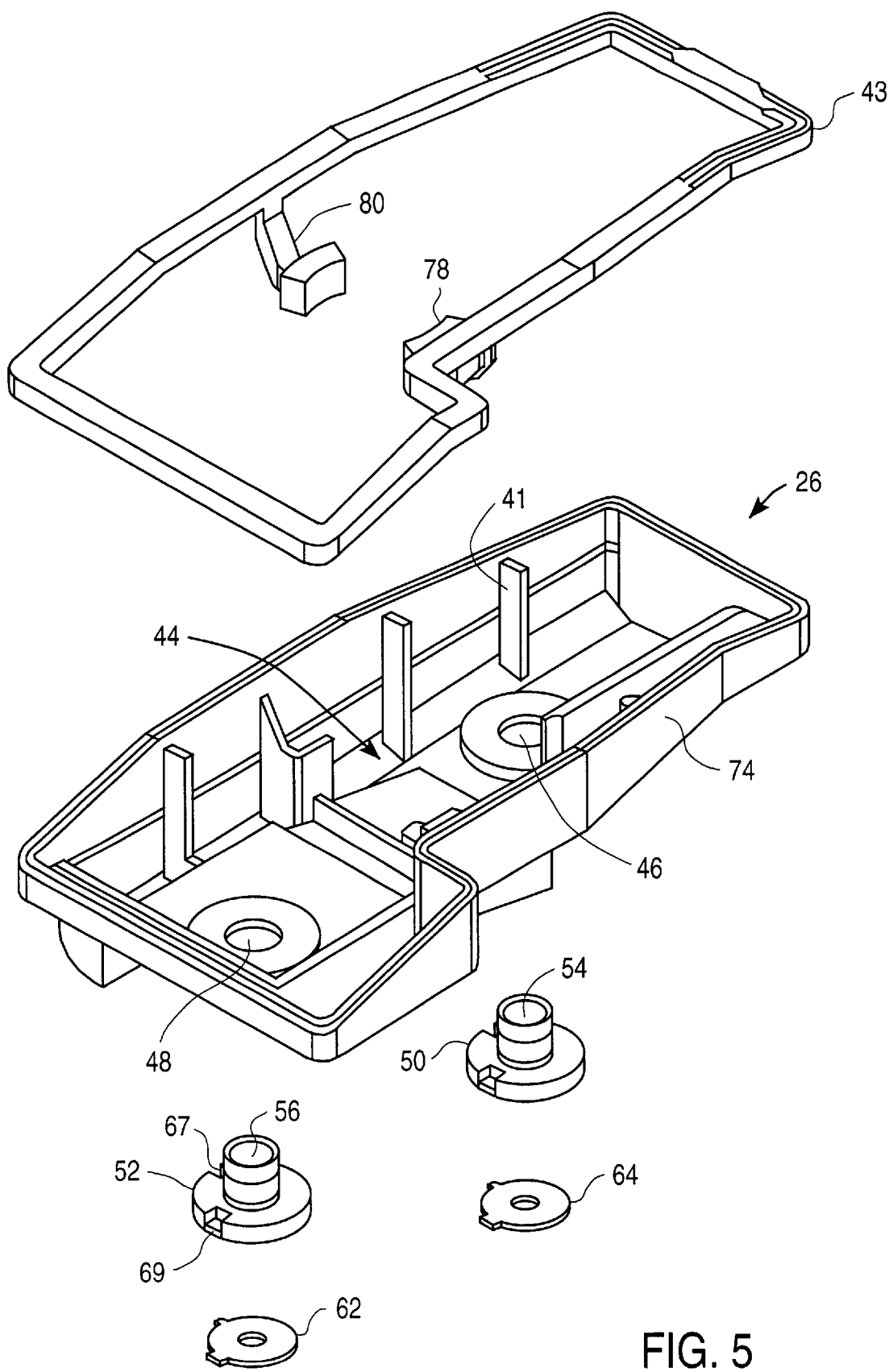
FIG. 5 is similar to FIG. 4 but illustrates a bottom view of the speaker enclosure illustrated in FIG. 4.
Figure 6:
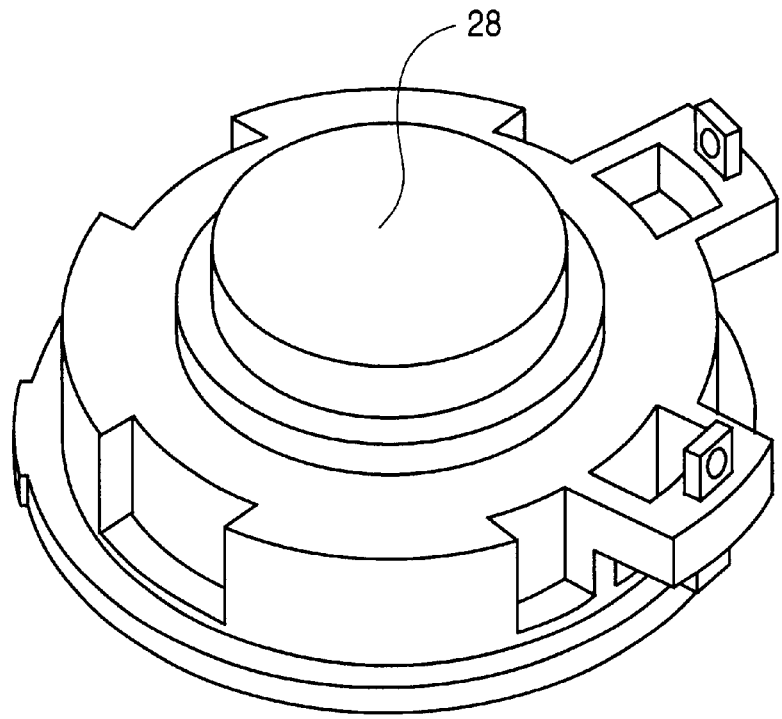
FIG. 6 is an exploded perspective view of a speaker and speaker gasket for use with the present invention.
Figure 6:
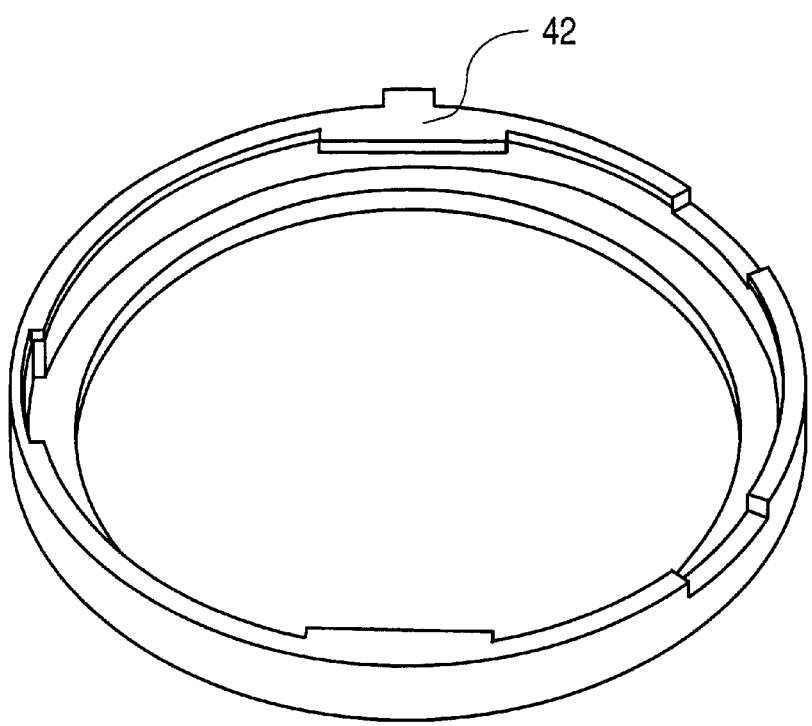

Another aspect of the invention relates to the speaker enclosure 26, shown in FIGS. 4 and 5. As discussed below, a main gasket or damping material 43, (FIG. 2) which may be attached to the speaker enclosure 26, is used for several reasons as follows: to provide mechanical isolation between the top cover 24 and the speaker enclosure 26; to form the sealed chamber 30 behind the speaker; and to hold the speaker 28 in place against the top cover 24.

The speaker enclosure 26 may be formed as in injection molded part, for example, from clear plastic, to facilitate alignment. The speaker enclosure 26 may be formed with an irregular shape as shown with a plurality of ribs 41 on the under side for rigidity. As shown best in FIG. 5, the speaker enclosure 26 is formed with a cavity 44 for receiving the back of the speaker 28 and also for forming the chamber 30 behind the speaker 28. Disposed adjacent the cavity 44 are a pair of countersunk apertures, identified with the reference numerals 46 and 48. The countersunk apertures 46 and 48 are adapted to receive shoulder gaskets 50 and 52. The shoulder gaskets 50 and 52 are formed with central apertures 54 and 54 which enable the shoulder gaskets 50 and 52 to fit over a pair of screw posts 58 and 59 formed in the top cover 24.

As best shown in FIG. 2, the shoulder gaskets 50 and 52 seal the speaker enclosure 26 around the screw posts 58 and 59 as well as mechanically isolate the speaker enclosure 26 from the top cover 24 and the base 22. The apertures 46 and 48 formed in the speaker enclosure 26 as well as the apertures 54 and 56 formed in the shoulder gaskets 50 and 56 are adapted to be aligned with a pair of apertures 61 and 63 formed in the base 22. A pair of flat washers 62 and 64 are adapted to be received in a recessed area on the top of the shoulder gaskets 50 and 52. Each of the flat washers 62 and 64 may be formed with one or more radial extending tabs 63 and 64 may be formed with one or more radial extending tabs 63 and 65 that are adapted to be received in corresponding radially disposed apertures 67 and 69, formed in the shoulder gaskets 50 and 52 and 64 in order to secure the flat washers 62 and 64 relative to the shoulder gaskets 50 and 52.

After the speaker 28 and its corresponding gasket 42 is disposed in the loudspeaker support structure 36 in the top cover 22, the speaker enclosure 26 is assembled to the top cover 22 by aligning the apertures 46 and 48 with the screw posts 58 and 59. By forming the speaker enclosure 26 from a transparent material, alignment of the speaker enclosure 26 relative to top cover 24 is rather simple. Next, the shoulder gaskets 50 and 52 are positioned over the screw posts 58 and 59 and the top cover 24 and seated in the countersunk apertures 46 and 48, formed in the speaker enclosure 26. The flat washers 62 and 64 may either be mounted to the shoulder washers 50 and 52 at the time or may be assembled to the shoulder washers 50 and 52 beforehand. The base 22 is then aligned with the top cover 24. In particular, the apertures 58 and 60 formed in the bottom of the base are aligned with the screw posts 58 and 59 formed in the top cover 24. The base 22 is then secured to the top cover 24 by way of suitable fasteners 71 and 73.

The shoulder gaskets 50 and 52 perform several functions. First, they slide over the screw posts 58 and 59 to align the speaker enclosure 26 relative to the top cover 24. Second, the shoulder gaskets 50 and 52 hold the speaker enclosure 26 in place as the partially assembled device moves down the assembly line to the screw station. In addition, the shoulder gasket 50 and 52 provide mechanical isolation between the speaker enclosure 26, the top cover 24 and the base 22, as best shown in FIG. 2.

As mentioned above, a main gasket 43 is used as the contact points between the top cover 24 and the speaker enclosure 26, shown best in FIGS. 4 and 5. The gasket 43 is formed with a generally U-shaped cross-section and formed generally to conform to the shape of the speaker enclosure 26. The U-shaped cross-section facilitates alignment and assembly of the gasket 43 to the speaker enclosure 26. In particular, as best shown in FIG. 4, the U-shaped cross-section is formed by an interior sidewall portion 68 and an exterior sidewall portion 70 defining a trench portion 72 therebetween. The trench portion 72 is adapted to receive a portion of an extending sidewall 74, formed around the speaker enclosure 26. In order to help maintain the gasket 43 in place relative to the speaker enclosure 26, the inner wall 68 of the speaker enclosure 26 may be formed with increased height portions 74 at the corners as well as at various other portions along the gasket 43. These portions increase the contact area between the speaker enclosure 26 and the gasket 43 to help hold the gasket 43 in place.

In addition to providing mechanical isolation between the speaker enclosure 26 and the top cover 24, the gasket 43 is used to hold the speaker 28 in place. In particular, the gasket 43 is formed with a pair of inwardly projecting arms 78 and 80. These arms 78, 80 project inward relative to each other, as best shown in FIGS. 4 and 5. When the gasket 43 is assembled to the speaker enclosure 26, and, in turn, assembled to the top cover 24, the arms 78 and 80 hold the back of the speaker 28 against the top cover 24 as best shown in FIG. 2.

Figure 3:
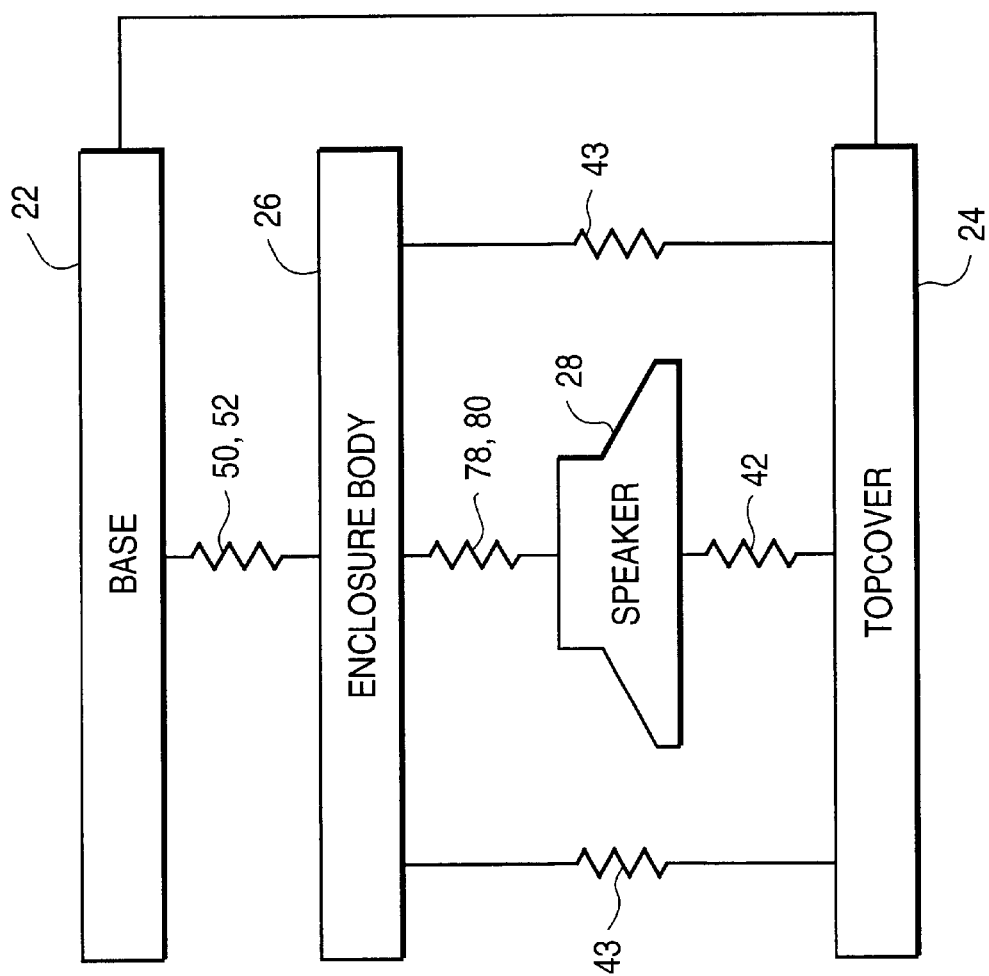
FIG. 3 is a mechanical schematic illustrated the isolation of the speaker enclosure and the base and top cover of the telephone illustrated in FIG. 1.

Once assembled, the telephone 20 can be molded as illustrated in FIG. 3. Each of the gaskets or other damping material is represented by a spring. As shown, the speaker 28 as well as the enclosure body 26 are mechanically isolated from the top cover 24 and the base 22 as well as from each other. As mentioned above, mechanical isolation of the speaker 28 reduces non-linear mechanical coupling to the microphone and also minimizes non-linear vibrational noise within the telephone 20 which can be acoustically coupled to the telephone, thereby improving the performance of the system.

Various gaskets 42, 50, 52 and 43 are shown. These gaskets may be formed from a material with linear compression characteristic, such as injection molded thermal plastic elastomer (TPE). However, any pliant material such as a damping material with a linear compression characteristic is suitable. In embodiments of the invention in which a sealed chamber is formed behind the speaker, the pliant material must be able to be amenable to sealing to form the sealed chamber 30.

What is claimed is:

1. A apparatus, comprising:
   a speaker;
   a first housing member;
   a second housing member adapted to be secured to said first housing member, said second housing member formed with a microphone support portion and a speaker support portion;
   a speaker enclosure adapted to be disposed between said first housing member and said second housing member, adjacent said speaker support portion of said second housing member, said speaker enclosure forming a cavity behind said speaker:
   wherein said speaker is mechanically isolated by a pliant material from said speaker enclosure and said second housing member, and said speaker enclosure is further mechanically isolated by a pliant material from said first housing member and said second housing member.

2. The apparatus as recited in claim 1, wherein said pliant material is a damping material.

3. The apparatus as recited in claim 2, wherein said damping material has a linear compression characteristic.

4. The apparatus as recited in claim 1, wherein a first set of contact points is defined between said first housing member and said speaker enclosure and between said second housing member and said speaker enclosure and said pliant material is disposed at said contact points to mechanically isolate said first housing member, said second housing member and said speaker enclosure.

5. The apparatus as recited in claim 4, wherein second contact points are defined between said speaker, said speaker enclosure and said second housing member, and said pliant material is disposed at said second contact points to mechanically isolate said speaker from said second housing member and said speaker enclosure.

6. The apparatus as recited in claim 5, wherein said pliant material is a damping material.

7. The apparatus as recited in claim 6, wherein said damping material has a linear compression characteristic.

8. The apparatus as recited in claim 7, wherein said damping material is a thermoplastic elastomer.

9. The apparatus as recited in claim 8, wherein said thermoplastic elastomer is injection molded.

10. An apparatus for carrying a speaker, comprising:
    a first housing member;
    a second housing member adapted to be secured to said first housing member;
    one member selected from the set of said first housing member and said second housing member formed with microphone support portion;
    the other housing member formed with a speaker support portion for carrying a speaker; and
    a speaker enclosure adapted to be disposed between said first housing member and said second housing member, adjacent said microphone support portion, said speaker enclosure forming a cavity behind said speaker;
    wherein said speaker is mechanically isolated from said speaker enclosure and said second housing member by a pliant material, and said speaker enclosure is further mechanically isolated by a pliant material from said first housing member and said second housing member.

11. The apparatus as recited in claim 10, wherein first contact points are defined between said first housing member and said speaker enclosure and between said second housing member and said speaker enclosure and further including a pliant material disposed at said first contact points to mechanically isolate said first housing member, said second housing member and said speaker enclosure.

12. The apparatus as recited in claim 11, wherein second contact points are defined between said speaker and said speaker enclosure and said second housing member and said pliant material disposed at said second contact points to mechanically isolate said speaker from speaker enclosure and said second housing member.

13. The apparatus as recited in claim 12, wherein said pliant material is a damping material with a linear compression characteristic.

14. The apparatus as recited in claim 13, wherein said damping material is a thermoplastic elastomer.

15. The apparatus as recited in claim 14, wherein said thermoplastic elastomer is injection molded.

16. The apparatus as recited in claim 10, wherein said cavity behind said speaker is sealed.

17. The apparatus as recited in claim 10, wherein both of said microphone support portion and said speaker support portion are formed on the same housing member.

* * * * *